(12) United States Patent
Blackburn et al.

(10) Patent No.: US 9,919,388 B2
(45) Date of Patent: Mar. 20, 2018

(54) METHOD FOR REPAIRING A LAMINATED ARTICLE HAVING A DAMAGED AREA

(71) Applicant: General Electric Company, Schenectady, NY (US)

(72) Inventors: Michelle Ann Blackburn, Oxford, OH (US); Stephen Michael Deak, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 1000 days.

(21) Appl. No.: 13/678,035

(22) Filed: Nov. 15, 2012

(65) Prior Publication Data

US 2013/0192742 A1 Aug. 1, 2013

Related U.S. Application Data

(60) Provisional application No. 61/590,901, filed on Jan. 26, 2012.

(51) Int. Cl.
*B29C 65/00* (2006.01)
*B32B 37/00* (2006.01)
(Continued)

(52) U.S. Cl.
CPC .......... *B23P 6/002* (2013.01); *B29C 35/0227* (2013.01); *B29C 73/10* (2013.01);
(Continued)

(58) Field of Classification Search
CPC ........ B29C 65/00; B29C 65/02; B29C 65/48; B29C 65/483; B29C 65/4835; B29C 66/00; B29C 66/001; B29C 66/00145; B29C 35/00; B29C 35/02; B29C 35/0227; B32B 37/00; B32B 37/06; B32B 37/10;
(Continued)

(56) References Cited

U.S. PATENT DOCUMENTS 4,352,707 A 10/1982 Wengler et al.
4,808,253 A 2/1989 Mimbs
(Continued)

FOREIGN PATENT DOCUMENTS

CN 101934590 A 1/2011

OTHER PUBLICATIONS

Merriam Webster's definition of autoclave.*
Search Report from corresponding GB Application No. 1301180.4, dated May 21, 2013.

*Primary Examiner* — Jacob T Minskey
*Assistant Examiner* — Matthew Hoover
(74) *Attorney, Agent, or Firm* — General Electric Company; Pamela A. Kachur

(57) ABSTRACT

A method for repairing a laminated article having a damaged area comprising the steps of: removing the damaged area from the laminated article so as to leave a repair site; positioning a repair patch to cover the repair site; placing one or more heat blankets over the repair patch and other selected locations; placing the laminated article with the repair patch in a vacuum bag; placing the vacuum bag in an autoclave; operating the autoclave within a selected range of desired temperatures and pressures; and, curing the repair patch of the laminated article without disturbing or damaging the adjacent bondments within a composite structure.

14 Claims, 3 Drawing Sheets

(51) Int. Cl.
*B32B 43/00* (2006.01)
*B64C 11/00* (2006.01)
*B64C 27/00* (2006.01)
*B23P 6/00* (2006.01)
*B29C 73/10* (2006.01)
*B29C 73/12* (2006.01)
*B29C 73/30* (2006.01)
*B29C 73/32* (2006.01)
*B29C 35/02* (2006.01)

(52) U.S. Cl.
CPC ............. *B29C 73/12* (2013.01); *B29C 73/30* (2013.01); *B29C 73/32* (2013.01)

(58) Field of Classification Search
CPC ............... B32B 37/1018; B32B 37/12; B32B 2037/1253; B32B 37/1207; B32B 43/00; B32B 2556/00; B64C 11/00; B64C 11/02; B64C 11/04; B64C 11/06; B64C 11/08; B64C 11/16; B64C 11/22; B64C 11/24; B64C 11/26; B64C 11/28; B64C 11/30; B64C 27/023; B64C 27/46; B64C 27/463; B64C 27/4733; B64C 27/467; B64C 27/473
See application file for complete search history.

(56) References Cited

U.S. PATENT DOCUMENTS

| | | |
|---|---|---|
| 4,824,500 A | 4/1989 | White et al. |
| 5,379,689 A | 1/1995 | Timmons et al. |
| 5,935,360 A | 8/1999 | Griggs |
| 5,958,166 A | 9/1999 | Walters |
| 6,413,051 B1 | 7/2002 | Chou et al. |
| 6,561,247 B2 * | 5/2003 | Chou .................... B29C 73/025 156/285 |
| 7,368,073 B2 | 5/2008 | Krogager et al. |
| 2001/0008161 A1 | 7/2001 | Kociemba |
| 2003/0188821 A1 * | 10/2003 | Keller .................... B29C 43/12 156/94 |
| 2005/0022922 A1 * | 2/2005 | Banasky ............. B29C 35/0227 156/94 |
| 2006/0027308 A1 * | 2/2006 | MacKenzie ............ B29C 73/30 156/94 |
| 2006/0108058 A1 * | 5/2006 | Chapman .............. B29C 70/323 156/245 |
| 2011/0132523 A1 * | 6/2011 | Evens .................... B29C 73/10 156/94 |
| 2012/0145703 A1 | 6/2012 | Matsen |

\* cited by examiner

METHOD FOR REPAIRING A LAMINATED ARTICLE HAVING A DAMAGED AREA

CROSS REFERENCE TO RELATED APPLICATION

This application claims the benefit of U.S. Provisional Application No. 61/590,901, filed Jan. 26, 2012, which is incorporated by reference in its entirety.

BACKGROUND AND PROBLEM SOLVED

It is well known as a problem presented to those experienced in the art that repair of composite articles is a difficult matter that requires great skill in the analysis and locating of faults both at and beneath the surface of composite articles. This is especially so in the aerospace industry and in particular when the problem to be solved lies within the field of use relating to the use and maintenance of reinforced composite laminated gas turbine engine fan blades as found in aircraft engines. Damage occurs to fan blades and there has been long-felt need in the art to offer engine operators the option of repairing damaged fan blades. No repair method exists in the Art to repair fan blade subsurface faults in the manner of the present embodiments.

Current methods include those found in U.S. Pat. No. 5,379,689 which discloses a heated press apparatus for delamination repair. U.S. Pat. No. 4,352,707 discloses an apparatus for local heating. U.S. Pat. No. 6,561,247 discloses an apparatus for repairing a fan blade. U.S. Pat. No. 5,935,360 discloses a method for repairing a strip to a composite article surface, and U.S. Pat. No. 4,808,253 discloses the use of a grease, or liquid-filled bag to transfer force and heat to a contoured repair area. As such, the prior art does not encompass the repair of subsurface faults such as in fan blades in the manner of the present embodiments.

Embodiments and alternatives are provided of a method for composite article repair. Embodiments allow for the repair of composite article faults such as in a fan blade. The repair is addressed by removal of material until the fault is reached and then replacement of that material.

DESCRIPTION OF THE EMBODIMENTS

Figure 1:
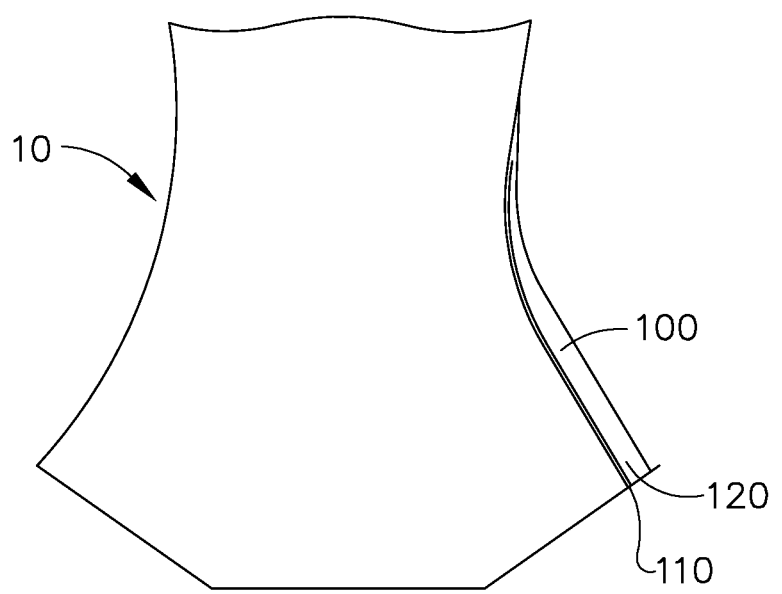
FIG. 1 is a cross-sectional view of a portion of an article to be repaired in accordance with an embodiment of a method for repairing a laminated article having a damaged area.

With reference to FIG. 1 and for the purposes of example not meant to be limiting, an article 10 to be repaired is provided such as, for example, a composite fan blade. Suppose in this example that in the course of inspection, a fault within the article 10 is detected. Embodiments include those wherein the article 10 is machined to remove the fault, or alternatively, the fault is removed using hand tools (not shown) and associated hand tool removal methods. At a location for a repair site 100, an adhesive 110, such as, for example a film adhesive, is applied along with a repair patch 120 sufficient to restore the article 10 to previous construction.

Figure 2:
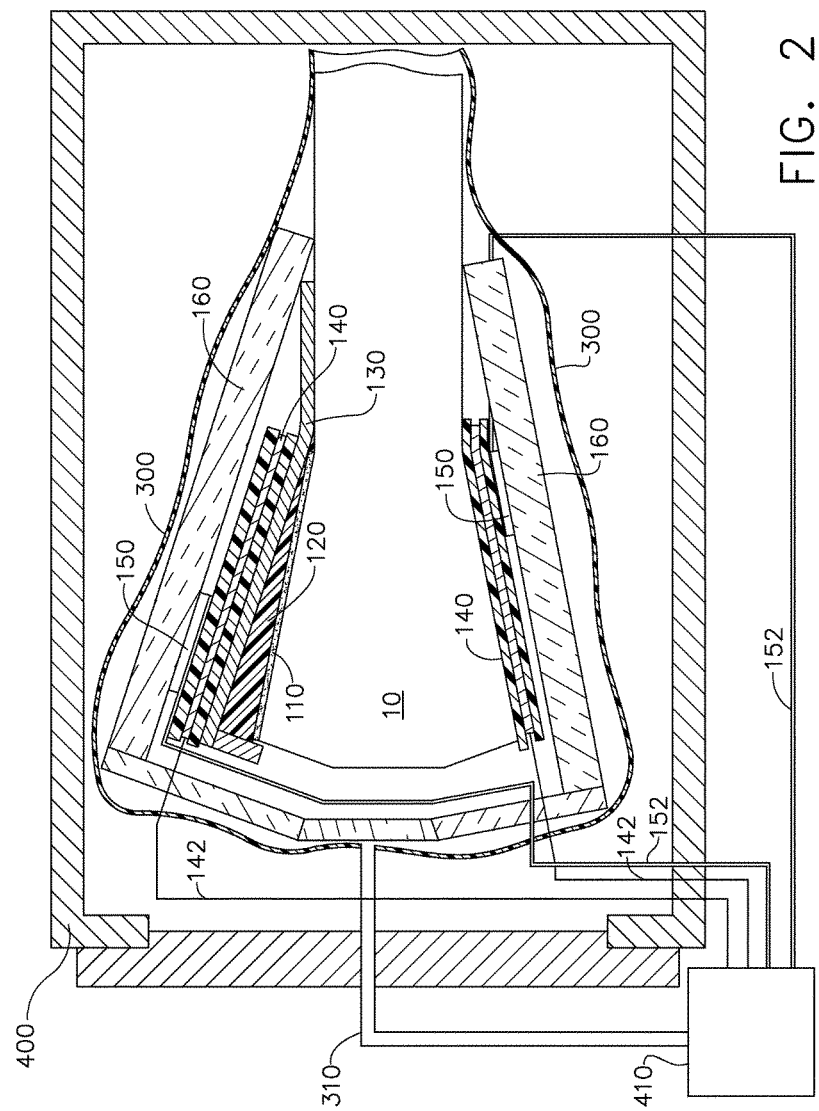
FIG. 2 is a cross-sectional view showing selected details of an article to be repaired in accordance with an embodiment of a method for repairing a laminated article having a damaged area.

With reference to FIG. 2, embodiments and alternatives provide that heat may be locally applied using one or more local heat blankets 140. Other alternatives provide that the heat is applied in an autoclave 400. Even additional alternative embodiments provide that the heat is applied by both heat blanket 140 and autoclave 400. As desired, the autoclave 400 is used to cure the repair site 100 wherein the article 10 to be repaired is placed within a vacuum bag 300.

Figure 3:
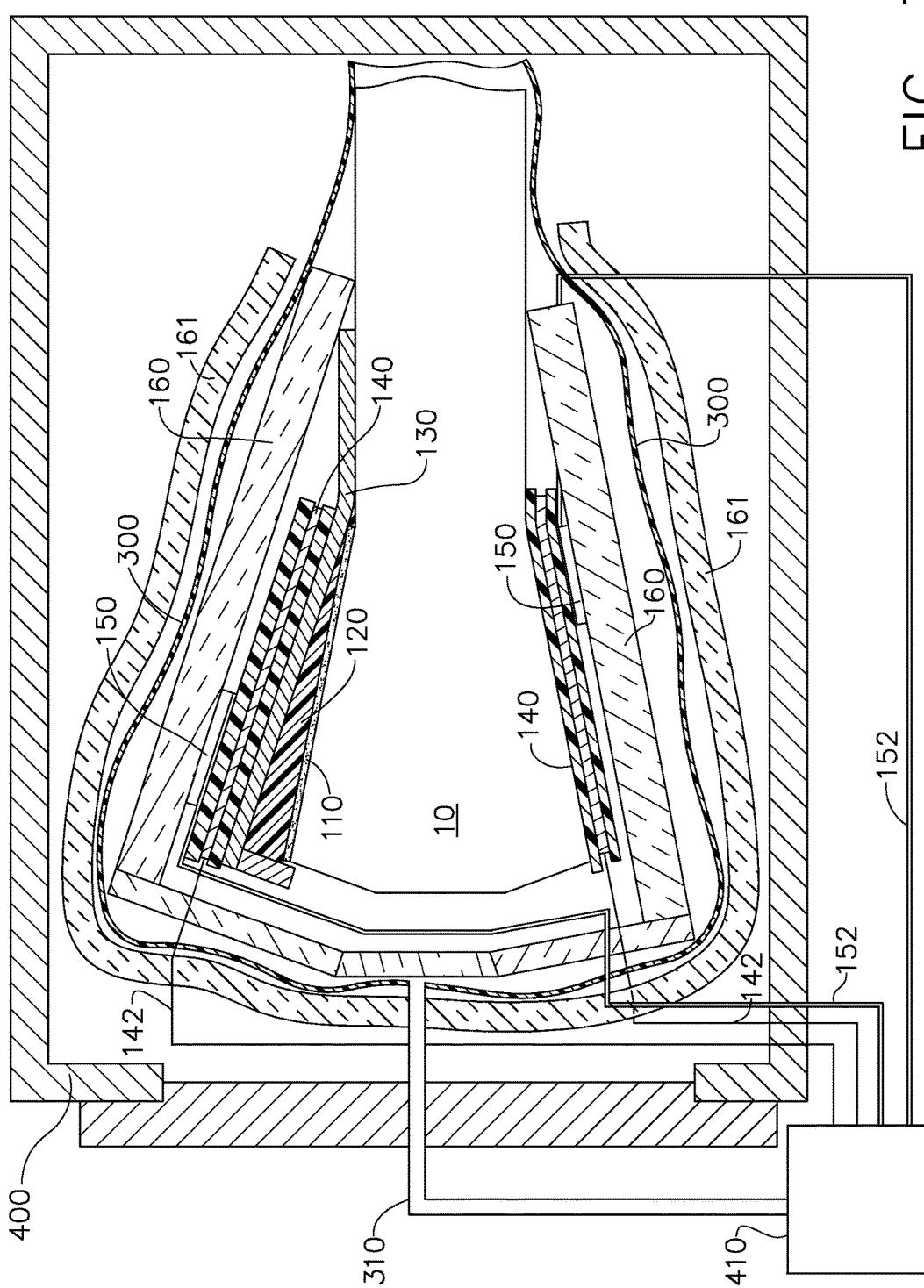
FIG. 3 is a cross-sectional view showing selected details of an article to be repaired in accordance with another embodiment of a method for repairing a laminated article having a damaged area.

With continued reference to the Figures, embodiments include those directed to a method for composite article repair that includes advances in the art to include retaining the repair patch 120 of an article 10 to be repaired. The repair patch 120 is provided in materials and layup to conform, as desired, to the construction of the original article 10. For example, the repair patch 120 is found in some embodiments to comprise a composite ply makeup. As desired, the repair patch 120 is held in place with a rigid caul tool 130 to retain and thereby provide a correct contour of the repair site 100. In addition to the use of caul tool 130, pressure is applied in the form of a combination of both conformal pressure applied by the vacuum bag 300 and additional pressure applied by the autoclave 400. For example, an inert gas may be introduced into the autoclave and thereby cause pressure to be applied to the article 10. In addition, some embodiments provide that a vacuum line 310 connects the vacuum bag 300 which surrounds the article 10 in order that the autoclave 400 pulls vacuum at a selectable range through the vacuum line 310 and thereby create a vacuum condition within the vacuum bag 300. Alternatives provide that the autoclave 400 pulls vacuum within its enclosure and not by virtue of any connection made with a vacuum line 310. In other words, some autoclaves 400 are capable of providing and controlling either or both of vacuum or pressure within their enclosures. Alternatives provide that the autoclave pulls no vacuum and instead that any pressure placed upon the article 10 is caused by gas introduction alone, thereby causing pressure inside the autoclave 400. These variations on methods that utilize vacuum and pressure introduction are among the interchangeable embodiments and alternatives provided. This pressure combination provides additional consolidation of the repair patch 120 during cure and it creates a higher quality structure with no voids. As shown in FIG. 2, the one or more heat blankets 140 are applied to the repair site 100 and other article surfaces, as desired, along with a thermal blanket 160, provided in some embodiments as a woven glass cloth. The thermal blanket 160 is provided, as desired, in a layered arrangement to include the use of one or more layers of glass cloth. Alternatives include those wherein more than one thermal blanket 160 is provided. For example not meant to be limiting, embodiments as shown in FIG. 3 provide a thermal blanket 160 and a second thermal blanket 161. The thermal blankets 160, 161 can be of the same or similar construction as illustrated for example not meant to be limiting, or of different construction.

Embodiments provide that the article 10 is placed in an autoclave 400 where a cure cycle occurs which includes heating the article 10 to an elevated temperature in order to reduce thermal gradients across the repair site 100. Alternatives include those wherein the heat blanket 140 temperature is controlled precisely in order to prevent thermal damage to bondments adjacent to the repair site 100. Further embodiments include those wherein precise temperature control of the one or more heat blankets 140 is provided by a heat blanket controller 410, such as, for example, hot bonder (see FIGS. 2 and 3). The heat blankets 140 are controlled either by controls integral to the autoclave 400 or by controls provided by a heat blanket controller 410 that is external to the enclosure of the autoclave 400. Alternatives include those wherein the autoclave 400 has integral controls to provide the function of either or both of the heat blanket controller 410 and autoclave heat controller. At least one heat blanket wire lead 142 connects the heat blanket 140 to the heat blanket controller 410. At least one thermocouple wire lead 152 connects one or more thermocouples 150 to the heat blanket controller 410. Alternatives provide that the autoclave 400 provide and control a source of vacuum wherein vacuum is applied to the vacuum bag 300 through a vacuum line 310, thereby resulting in pressure being placed upon the article 10 within the vacuum bag 300. Other alternatives provide that the autoclave 400 introduce gas into its enclosure thereby causing pressure to be applied upon the article 10. Further alternatives provide for gas pressure provided by the autoclave 400 with vacuum optionally provided or not at all.

Alternatives include those wherein an arrangement comprises the article 10 having all desired elements placed upon it, elements of the arrangement selected from a group including but not limited to adhesive 110, repair patch 120, caul tool 130, heat blanket 140 and thermal blanket 160 with the vacuum bag 300 having heat blanket wire leads 142 and thermocouple wire leads 152 protruding therefrom as required. With reference to FIG. 2, alternatives include those wherein the vacuum bag 300 comprises an outermost layer for the article 10 that is placed in the autoclave 400. As shown in FIG. 3, other embodiments provide that a thermal blanket 160 comprises the outermost layer for the article 10 that is placed in the autoclave 400. With reference to both FIGS. 2 and 3, leads 142, 152 are routed to the heat blanket controller 410. In this fashion, temperature is monitored and controlled by the heat blanket controller 410 and the pressure and, for embodiments wherein the vacuum bag 300 is connected to a source of vacuum within the autoclave 400, vacuum is monitored and controlled by the autoclave 400. In addition, embodiments provide that the heat blankets 140 apply heat to the article 10 and that, as desired, the autoclave 400 provides autoclave heat to the enclosure within the autoclave 400, thereby providing heat to the entire arrangement within the autoclave 400, separate and apart from any heat applied by the heat blankets 140. Embodiments provide that both the heat blanket controller 410 and the autoclave 400 have within them a means to record the passage of time, embodiments including those wherein the passage of time is synchronized to be recorded in common for both the heat blanket controller 410 and the autoclave 400. Alternatives include those wherein the heat blanket controller 410 and the autoclave 400 are provided to together control a cure cycle wherein a controller having a control system integral to same utilizes a processor and transforms a preselected control algorithm into steps taken to cure the article 10 to be repaired.

With respect to further details as to control of temperature and pressure, the heat blanket controller 410 provides a heat cycle by monitoring the temperature across the repair site 100 while controlling the application of heat as required in order to set and maintain a desired heat value seen as a desired temperature distribution across the article 10.

The autoclave 400 provides a pressure cycle by monitoring temperature within the bag 300 in order to set and maintain a desired pressure value seen as a desired pressure distribution across the article 10. As above, alternatives provide that the autoclave 400 introduce gas into its enclosure thereby causing pressure to be applied upon the article 10. Further alternatives provide for gas pressure provided by the autoclave 400 with vacuum optionally provided or not at all. In all such cases, the autoclave 400 provides the pressure cycle as described above wherein the desired pressure distribution across the article 10 is achieved.

The repair method includes embodiments wherein the cure cycle includes the autoclave 400 providing and controlling heat, as desired, in addition to the heat provided by the heat blankets 140.

As desired and as provided, the heat, pressure, and vacuum cycles are referenced over time. As such, temperature, pressure and vacuum are measured and controlled throughout the cure cycle. Alternatives include those wherein temperature, pressure and vacuum are variable as desired over time. Further alternatives include those wherein the temperature, pressure and vacuum may be set at any value within a range of values without regard to any value that was set prior or may be set afterwards with respect to the value seen at any particular time, thereby allowing the controller to vary any or all temperature, pressure, and vacuum. Furthermore, alternatives provide that any or all temperature, pressure and vacuum is/are varied as desired, with or without reference to the other, throughout the cure cycle. Even further alternatives provide that the autoclave 400 may provide heat, as desired, in addition to the heat provided by the heat blankets 140.

Alternative embodiments are provided that allow for one repair session to occur wherein method steps are taken to repair either, both, any, or all, as desired, sides or areas of an article 10 to be repaired.

Exemplar of One of the Many Interchangeable Embodiments

With continued reference to the Figures, a method for repairing a laminated article 10 having a damaged area comprises the steps of:

1. Removing the damaged area from the laminated article 10 so as to leave a repair site 100.
2. Positioning a repair patch 120 to cover at least the repair site 100.
3. Positioning at least one heat blanket 140 to cover at least the repair patch 120 and any other selected area, as desired.
4. Placing the laminated article 10 with the repair patch 120 in a vacuum bag 300.
5. Placing the vacuum bag 300 in an autoclave 400.
6. Operating the autoclave 400 within a selected range of desired temperatures and pressures wherein directed heat is applied to the article 10 within the vacuum bag 300, the directed heat being applied by at least one heat blanket 140.
7. Curing the repair patch 120 of the laminated article 10.

Alternatives include those wherein the repair patch 120 is retained in the desired position using a caul tool 130. Embodiments provide that the autoclave 400 is operated at temperatures and pressures that vary as desired and as measured at the repair site 100 to be within a range of about 275 F to about 500 F and at pressures within a range of about 50 psi to about 200 psi. Alternatives provide that In addition to the directed heat applied by at least one heat blanket 140, the autoclave is selectably capable of providing autoclave heat within its enclosure. For example, in some embodiments of the method, whether the autoclave 400 is capable of providing heat or not, the autoclave 400 provides no autoclave heat. Other embodiments provide that the autoclave 400 provide autoclave heat from a heating source and control system that is included as part of the autoclave 400 itself. For alternatives wherein the autoclave is capable of providing autoclave heat, such autoclave heat is provided at temperatures that vary within a range of about 100 F to about 300 F. Further embodiments include those wherein a mean value for the temperature and pressure as measured at the repair patch is about 350 F at about 90 PSI, respectively. Alternatives provide that the repair patch 120 is applied over the repair site 100 using an adhesive 110. Further alternatives provide that in addition to selectably introducing and controlling gas under pressure within the autoclave 400 as desired, the autoclave 400 may provide and control a source of vacuum wherein vacuum is applied to the vacuum bag 300 through suction upon the vacuum line 310, thereby resulting in pressure upon the article 10 and, as desired, vacuum, being placed upon the article 10 within the vacuum bag 300. Embodiments include those wherein the laminated article 10 is a composite gas turbine engine fan blade.

Embodiments include those wherein a method for repairing a laminated article 10 having a damaged area comprises the steps of:
1. Removing the damaged area from the laminated article 10 so as to leave a repair site 100.
2. Positioning a repair patch 120 to cover at least the repair site 100.
3. Positioning at least one heat blanket 140 to cover at least the repair patch 120, and any other area as desired.
4. Placing the laminated article 10 with the repair patch 120 in a vacuum bag 300.
5. Placing the vacuum bag 300 in an autoclave 400, wherein directed heat is applied to the article 10 within the vacuum bag 300, and the directed heat is applied by at least one heat blanket 140.
6. Heating with at least one heat blanket 140 and pressurizing the autoclave 400, and
7. Curing the repair patch 120 throughout a cure cycle.

Embodiments provide that the autoclave 400 is operated at temperatures and pressures that vary as desired and as measured at the repair site 100 to be within a range of about 275 F to about 500 F and at pressures within a range of about 50 psi to about 200 psi. Alternatives provide that In addition to the directed heat applied by the at least one heat blanket 140, the autoclave is selectably capable of providing autoclave heat within its enclosure. For example, in some embodiments of the method, whether the autoclave 400 is capable of providing heat or not, the autoclave 400 provides no autoclave heat. Other embodiments provide that the autoclave 400 provide autoclave heat from a heating source and control system that is included as part of the autoclave 400 itself. For alternatives wherein the autoclave is capable of providing autoclave heat, such autoclave heat is provided at temperatures that vary within a range of about 100 F to about 300 F. Further embodiments include those wherein a mean value for the temperature and pressure as measured at the repair patch is about 350 F at about 90 PSI, respectively. Alternatives provide that the autoclave 400 provide and control a source of vacuum wherein vacuum is applied to the vacuum bag 300 through a vacuum line 310, thereby resulting in a vacuum condition as measured at the repair site 100 of the article 10 within the vacuum bag 300.

Alternatives provide that the repair patch 120 is applied over the repair site 100 using an adhesive 110. Alternatives include those wherein the repair patch 120 is retained in the desired position using a caul tool 130. Further alternatives include those wherein the laminated article 10 is a composite gas turbine engine fan blade.

With respect to controls, embodiments include those wherein the heat blanket controller 410 provides a repair patch heat cycle by monitoring the temperature across the repair area 100 while controlling the application of heat as required in order to set and maintain a desired heat value that is measured by one or more thermocouples 150 as a desired temperature distribution across the repair patch 120. For embodiments wherein the autoclave 400 is capable of providing autoclave heat, the autoclave 400 provides an autoclave heat cycle by monitoring the temperature within the autoclave 400 while controlling the application of heat as required in order to set and maintain a desired autoclave heat value seen as a desired temperature as measured across the article 10 within the autoclave 400 itself and separate from the repair area temperature measured by the heat blanket controller 410. In addition, the autoclave 400 applies pressure to the article 10 using gas and optionally, in some alternatives, the autoclave 400 is capable of causing a vacuum condition within the vacuum bag 300. For example, the vacuum bag 300 is connected to the autoclave 400 by a vacuum line 310 and the autoclave 400 is thereby capable of providing suction upon the article 10.

Embodiments provide that the autoclave 400 can provide either or both of pressure and vacuum as desired. For example, the autoclave 400 draws suction upon the vacuum line 310 thereby causing a vacuum condition within the vacuum bag 300. The autoclave 400 provides a pressure cycle and, in some alternatives, a vacuum cycle upon the article 10 by monitoring pressure and, in some alternatives, vacuum, in order to set and maintain a desired pressure value seen as a desired pressure distribution as measured at the repair site 100 of the article 10. Furthermore, all heat, pressure and vacuum cycles are referenced over time. Temperature, pressure and vacuum are measured and controlled throughout the cure cycle and temperature, pressure and vacuum are variable as desired over time. Alternatives include those wherein at any time during the cure cycle, all temperatures, pressures and vacuum values are set at any value within a range of values without regard to any value that was set prior or that may be set afterwards during the cure cycle, thereby allowing the autoclave 400 and the heat blanket controller 410 to vary any or all of temperatures, pressures and vacuum values. Further alternatives include those wherein any or all of temperature, pressure and vacuum is/are varied as desired, with or without reference to any other, throughout the cure cycle.

With reference to FIG. 2, an arrangement for performing a repair to a damaged area on a laminated article 10 in an autoclave 400 comprises a repair patch 120 to cover a repair site 100, at least one heat blanket 140 applied to the article 10 in close proximity to the repair site 100, and a vacuum bag 300 applied over the laminated article 10. In addition, a vacuum line 310 is provided to connect the autoclave 400 with the vacuum bag 300 in order to allow a vacuum condition to be caused within the vacuum bag 300 and thereby cause a vacuum condition as measured at the repair site 100 of the article 10. Alternatives include those wherein the repair patch 120 is retained in a desired position using a caul tool 130. Embodiments include those further comprising at least one thermal blanket 160 applied to the article 10 in close proximity to the repair site 100. The thermal blanket 160 comprises at least one or more layers of woven glass cloth. Some alternatives provide that the thermal blanket 160 comprises three layers of woven glass cloth.

With reference to FIG. 3, yet further alternatives provide that two or more thermal blankets 160, 161 are used wherein one thermal blanket 160 is applied to the article 10 in close proximity to the repair site 100 as described above, and in addition, a second thermal blanket 161 is applied over the vacuum bag 300 thereby providing that the second thermal blanket 161 is an outermost layer for the article 10 that is placed in the autoclave 400.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A method for repairing a laminated article having a damaged area comprising the steps of:
    removing the damaged area from the laminated article so as to leave a repair site;
    positioning a repair patch to cover at least the repair site;
    positioning at least one heat blanket to cover at least the repair patch;
    positioning a thermal blanket on the at least one heat blanket;
    placing the laminated article with the repair patch, the at least one heat blanket, and the thermal blanket in a vacuum bag;
    positioning a second thermal blanket on the vacuum bag;
    placing the vacuum bag in an autoclave wherein the second thermal blanket is an outermost layer of the vacuum bag;
    operating the autoclave within a selected range of desired temperatures and pressures wherein directed heat is applied to the laminated article within the vacuum bag, the directed heat being applied by the at least one heat blanket; and
    curing the repair patch of the laminated article.

2. The method of claim 1 wherein the repair patch is retained in position using a caul tool.

3. The method of claim 1 wherein the at least one heat blanket within the autoclave provides directed heat at temperatures as measured at the repair site to be within a range of about 275 F to about 500 F, and wherein the autoclave provides pressure upon the article as measured at the repair site within a range of about 50 psi to about 200 psi.

4. The method of claim 3 wherein the vacuum bag is connected to the autoclave by a vacuum line and the autoclave is thereby capable of providing suction upon the article.

5. The method of claim 4, wherein in addition to the directed heat applied by the at least one heat blanket, the autoclave itself provides additional autoclave heat to the laminated article, the additional autoclave heat being provided at temperatures that vary within a range of about 100 F to about 300 F.

6. The method of claim 5 wherein a mean value for the temperature and pressure as measured at the repair patch is about 350 F and about 90 PSI, respectively.

7. The method of claim 6 wherein the repair patch is applied over the repair site using an adhesive.

8. The method of claim 1 wherein the laminated article is a composite gas turbine engine fan blade.

9. A method for repairing a laminated article having a damaged area comprising the steps of:
    removing the damaged area from the laminated article so as to leave a repair site;
    positioning a repair patch to cover the repair site;
    positioning at least one heat blanket to cover at least the repair patch;
    placing the laminated article with the repair patch in a vacuum bag;
    placing the vacuum bag in an autoclave;
    providing directed heat to the repair site via the heat provided by the at least one heating blanket and additional autoclave heat provided by the autoclave itself such that the temperatures as measured at the repair site are within a range of about 275 F to about 500 F;
    providing pressure via the autoclave to the repair site such that the pressure as measured at the repair site of the article is within a range of about 50 psi to about 200 psi; and,
    curing the repair patch throughout a cure cycle.

10. The method of claim 9, wherein the autoclave provides additional autoclave heat to the repair site at temperatures that vary within a range of about 100 F to about 300 F.

11. The method of claim 10 wherein a mean value for the temperature and pressure as measured at the repair site is about 350 F and about 90 PSI, respectively.

12. The method of claim 11 further comprising retaining the repair patch into position using a caul tool.

13. The method of claim 12 wherein the repair patch is applied over the repair site using an adhesive.

14. The method of claim 13 wherein the laminated article is a composite gas turbine engine fan blade.

* * * * *